United States Patent [19]

Peters et al.

[11] Patent Number: 4,991,796
[45] Date of Patent: Feb. 12, 1991

[54] RAM AIR TURBINE DRIVE SYSTEM

[75] Inventors: Walter C. Peters; William E. Seidel, both of Rockford, Ill.

[73] Assignee: Sundstrand Corporation, Rockford, Ill.

[21] Appl. No.: 271,439

[22] Filed: Nov. 14, 1988

[51] Int. Cl.⁵ .............................................. B64D 41/00
[52] U.S. Cl. ....................................... 244/58; 244/119
[58] Field of Search ..................... 244/58, 119; 416/48, 416/51, 52

[56] References Cited

U.S. PATENT DOCUMENTS

| | | | |
|---|---|---|---|
| 2,876,847 | 3/1959 | Blackburn et al. | |
| 2,967,572 | 1/1961 | Breaux et al. | 416/52 |
| 2,986,218 | 5/1961 | Wagner et al. | 416/52 |
| 3,149,678 | 9/1964 | Chilman | |
| 3,635,583 | 1/1972 | Chillman et al. | 416/48 |
| 3,635,584 | 1/1972 | Chillman et al. | 416/48 |
| 3,946,689 | 3/1976 | Robbins et al. | 114/67 |
| 4,411,596 | 10/1983 | Chilman | 416/51 |
| 4,578,019 | 3/1986 | Safarik | 416/1 |
| 4,676,458 | 6/1987 | Cohen | 244/58 |
| 4,692,093 | 9/1987 | Safarik | 416/1 |
| 4,701,104 | 10/1987 | Cohen | 416/44 |
| 4,717,095 | 1/1988 | Cohen et al. | 244/58 |
| 4,742,976 | 5/1988 | Cohen | 244/58 |
| 4,743,163 | 5/1988 | Markunas et al. | 416/44 |

FOREIGN PATENT DOCUMENTS

| | | | |
|---|---|---|---|
| 216060 | 7/1958 | Australia | 244/58 |
| 622543 | 5/1963 | Canada | 244/58 |

Primary Examiner—Charles T. Jordan
Assistant Examiner—Rochelle Lieberman
Attorney, Agent, or Firm—Wood, Phillips, Mason, Recktenwald & Van Santen

[57] ABSTRACT

A drive system is provided between a ram air turbine (10) and at least a pair of accessory power units (38,40) of an aircraft, the ram air turbine being movable between stowed and deployed positions relative to the fuselage of the aircraft. The problems of providing a compact lightweight design which eliminates extraneous components in the airstream and a system which operates at optimum speeds are solved by the use of a drive shaft (28) extending between the ram air turbine and a first accessory power unit (38), such as a hydraulic pump, within the aircraft fuselage. First gears (30, 34) rotatably couple an outer end of the main drive shaft to the ram air turbine. Second gears (36,48) rotatably couple an inner end of the main drive shaft to the first accessory power unit. Third gears, in the form of a gear train (54), rotatably couple the first accessory power unit to a second accessory power unit (40), such as an electrical generator, within the aircraft fuselage. The pair of accessory power units have generally parallel drive shafts (44,52) rotatably coupled by the gear train.

22 Claims, 2 Drawing Sheets

RAM AIR TURBINE DRIVE SYSTEM

FIELD OF THE INVENTION

This invention generally relates to the art of ram air turbines and, particularly, to a drive system between a ram air turbine and at least a pair of accessory power units of an aircraft.

BACKGROUND OF THE INVENTION

For many years, aircraft have included a backup power source as standard equipment for use in times of power outage in the main power system. This standard equipment usually is in the form of an air-driven turbine or fan which has a normal stowed position within the fuselage of the aircraft and which can be moved, usually lowered, to a deployed position in the airstream, thereby making use of the relative speed of the aircraft through the ambient air to cause the turbine blades or propellers to rotate. The rotation imparted to the blades due to their movement through the air then is used to drive an electrical generating gear system, a hydraulic pump to provide hydraulic power to the aircraft hydraulic system, or the like, during the aforementioned times of power outages. These air driven turbine arrangements often also include governor mechanisms that attempt to control the output rotational speed delivered from the propellers to electrical or hydraulic units.

In the past, a single ram air turbine was employed on a single aircraft, with that ram air turbine operatively associated with a given accessory. If the aircraft need for power was primarily hydraulic, with a small amount of electrical power required, the ram air turbine would be used to drive a pump, and aircraft batteries, or a controlled speed electrical motor driven by the ram air turbine hydraulic pump, used to provide the emergency electrical power requirements. If the primary power requirement was electrical, the ram air turbine would generally drive a generator with the small amount of hydraulic power required supplied by either accumulators or an A.C. motor driven hydraulic pump. However, in commercial and military applications today, more and more electronics are designed in the aircraft, such as in fly-by-wire flight controls. This additional electrical load, and subsequently the more even split between emergency electrical and emergency hydraulic power requirements has resulted in the need to efficiently provide both electrical and hydraulic power by driving both a generator and a pump from the ram air turbine. In addition to the need for an efficient source of long term electrical or hydraulic power is the need for extended range overwater operation of twin engine aircraft. Where, in the past, a ram air turbine was primarily intended for flight control to effect a controlled crash when all engines were inoperative, it now is desirable to use ram air turbines to provide long term electrical power to continue a flight when the aircraft engines are operating but the main aircraft generators have failed, or alternatively to provide long term hydraulic power when the main aircraft pumps have failed.

In view of these changing technologies, attempts have been made simply to add more and more accessories to the ram air turbine. For instance, this may be accomplished by adding accessories seriatum along an axial shaft. This necessitates driving all the accessories at the same rotational speed as the turbine and causes size problems in an environment where compact lightweight envelope design is desired. In addition, coupling systems must be run from the deployed pump and generator into the aircraft fuselage, using "soft" piping or a rotary joint which cause reliability problems. Whether it be in the form of additional gearboxes, piping, extended shafts or the like, deployment of extraneous components in the airstream causes obvious problems.

This invention is directed to a new and improved drive system between a ram air turbine and a plurality of accessory power units of the character described and which are located directly in the aircraft fuselage to satisfy the needs and solve the problems outlined above.

SUMMARY OF THE INVENTION

An object, therefore, of the invention is to provide a new and improved drive system between a ram air turbine and at least a pair of accessory power units of an aircraft, the ram air turbine being movable between stowed and deployed positions relative to the fuselage of the aircraft.

In the exemplary embodiment of the invention, a deployable ram air turbine includes a turbine shaft. A first accessory power unit, such as a hydraulic pump, is disposed within the aircraft fuselage and includes a first rotatable shaft means. A second accessory power unit, such as an electrical generator, also is disposed within the aircraft fuselage and includes a second rotatable shaft means. Drive shaft means extend between the ram air turbine and the first accessory power unit. First bevel gear means rotatably couple an outer end of the drive shaft means with the turbine shaft. Second bevel gear means rotatably couple an inner end of the drive shaft means with the first rotatable shaft means of the first accessory power unit. Gear train means rotatably couple the first rotatable shaft means directly to the second rotatable shaft means of the second accessory power unit within the aircraft fuselage.

As disclosed herein, the second bevel gear means are located at one end of the first rotatable shaft means and the first accessory power unit is located at an opposite end thereof. The gear train means are located intermediate the ends of the first rotatable shaft means and extend radially therefrom for coupling to the second rotatable shaft means of the second accessory power unit, the second rotatable shaft means being generally parallel to the first rotatable shaft means.

In the exemplary embodiment, the gear train means between the two accessory power units include a gearbox extending between respective housings of the power units.

The invention has a number of advantages including maintainability, speed optimization of the operative components, reduced structural loads and a small turbine envelope, as will be apparent from the detailed description of the invention.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
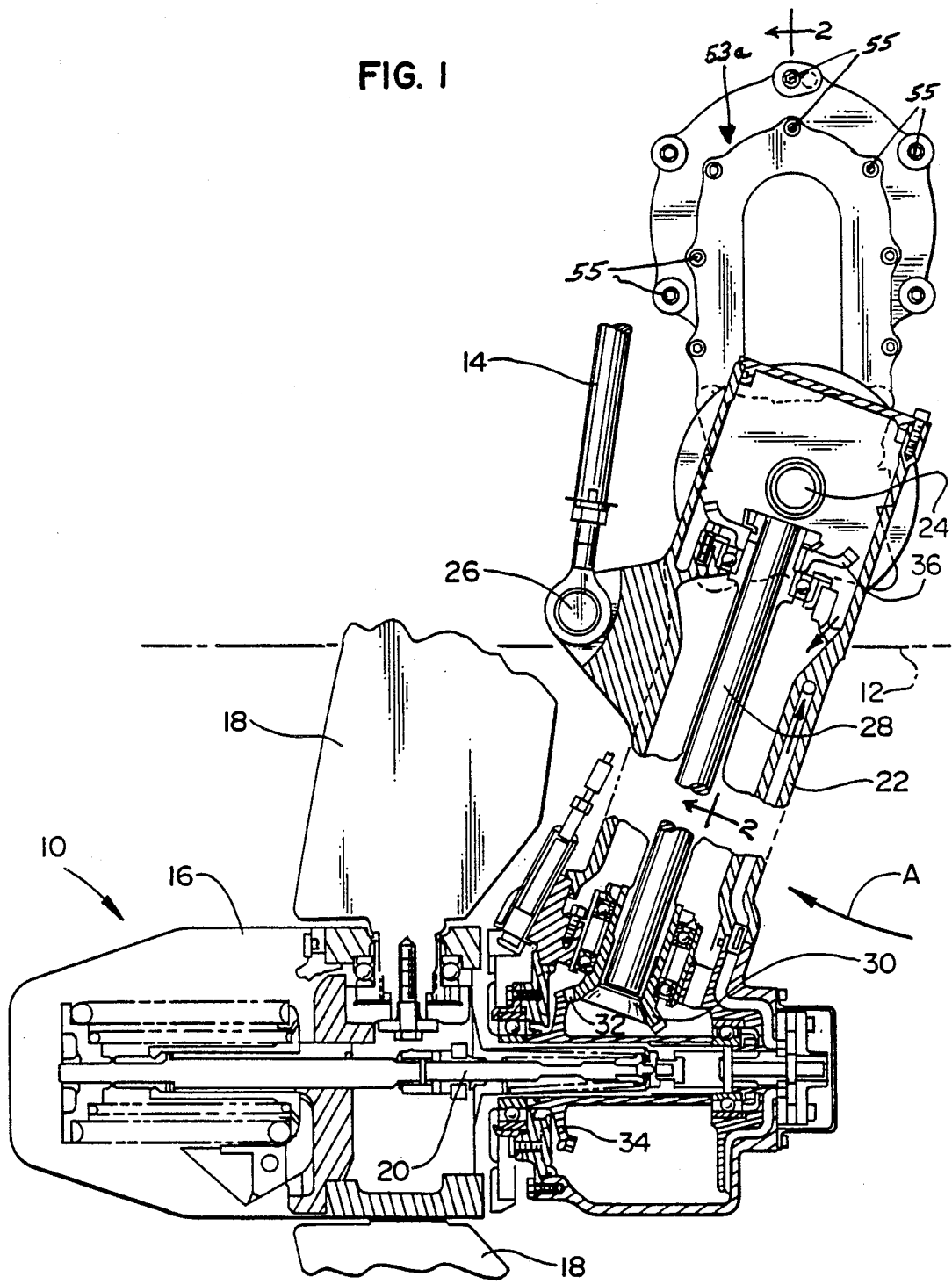
FIG. 1 generally is an axial section through a ram air turbine of substantially conventional configuration, in deployed condition and including the drive system of the invention.

Referring to the drawings in greater detail, a ram air turbine, generally designated 10, is mounted on an aircraft fuselage for movement between stowed and deployed positions. Although the entire aircraft fuselage is not shown, line 12 generally designates an outer skin of the fuselage and which defines the boundaries of an interior compartment within which the turbine is stowed. Of course, such ram air turbines are well known in the art and so are various deployment mechanisms, such as that shown in U.S. Pat. No. 4,676,458, dated Jun. 30, 1987, and assigned to the assignee of this invention. Suffice it to say, a deployment actuator, generally designated 14, is used to move the ram air turbine between its deployed and stowed positions. The turbine is shown in FIG. 1 in its deployed position.

Ram air turbine 10 itself is of generally conventional construction and includes a housing 16 with radially projecting propellers 18 extending into the airstream outside of the aircraft fuselage for rotating an interior turbine shaft 20. In essence, rotation of the propellers in the airstream rotate turbine shaft 20 to provide rotational power where needed, and as described hereinafter. Other components of the ram air turbine 10 are substantially conventional. A generally tubular shaft housing 22 extends from ram air turbine 10 upwardly into the fuselage compartment and is pivotally mounted therewithin, for pivotal movement about point 24. Actuator 14 is pivotally connected to housing 22 at 26. Therefore, movement of the housing in the direction of arrow "A" pivots the ram air turbine upwardly into the aircraft fuselage to its stored position.

Figure 2:
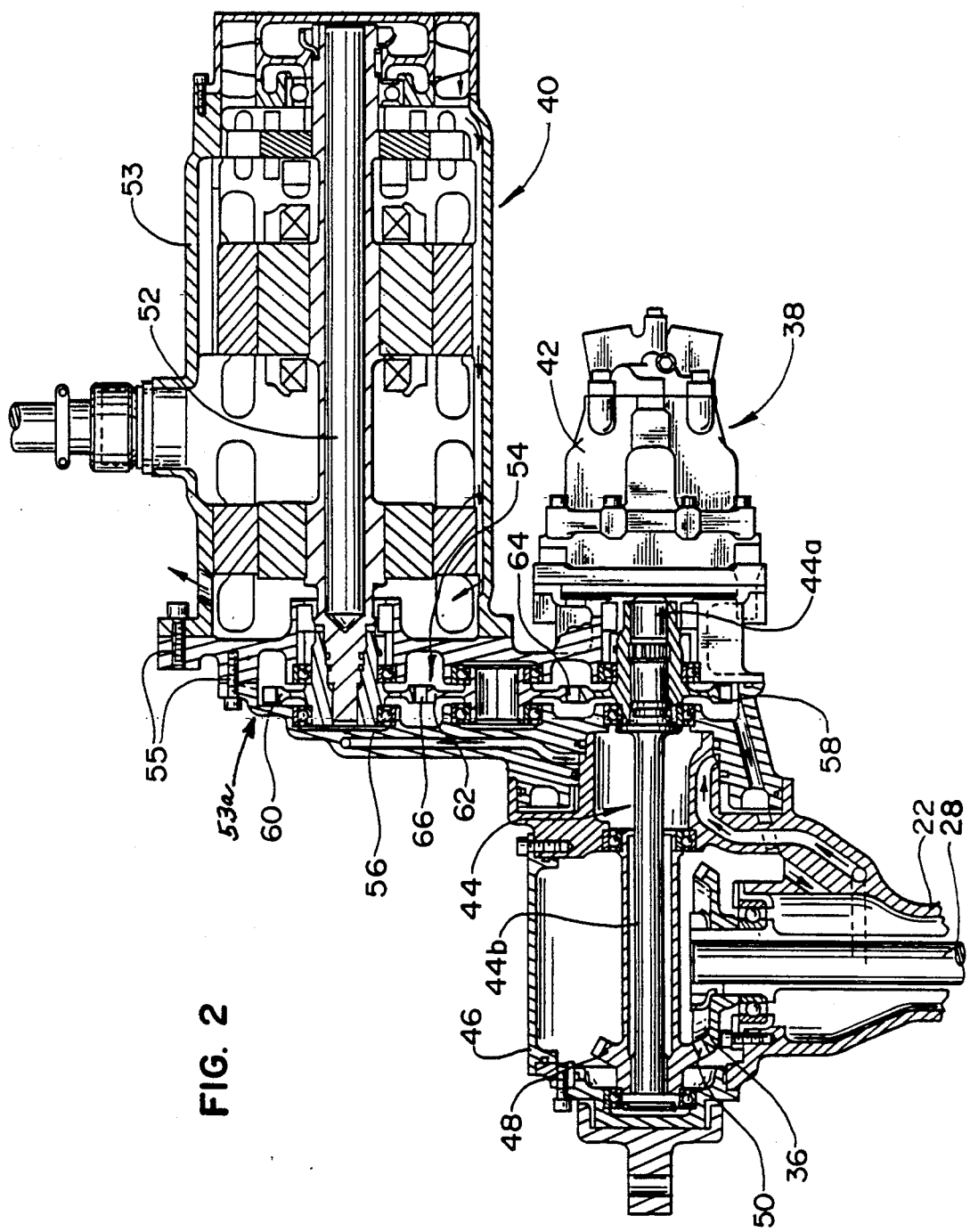
FIG. 2 is a fragmented section taken generally along line 2—2 of FIG. 1.

A main drive shaft 28 extends upwardly through tubular housing 22. A bevel gear member 30 is fixed to the lower or outer distal end of main drive shaft 28 and is in mesh, at 32, with a bevel gear member 34 fixed to turbine shaft 20. A second bevel gear member 36 also is shown in FIG. 1 fixed to the upper or inner end of main drive shaft 28. Therefore, as propellers 18 rotate turbine shaft 20, bevel gears 30,34 couple main drive shaft 28 for rotation by the turbine shaft, with upper bevel gear 32 rotatable therewith. FIG. 2 shows the fragmented upper portion of tubular housing 22 and main drive shaft 28, along with bevel gear member 36.

FIG. 2 shows a first accessory power unit, generally designated 38, and a second accessory power unit, generally designated 40. The invention is shown herein with those two accessory drive units, but it can be understood that the gear train means, described hereinafter, can be expanded to drive more than two units. Accessory power unit 38 is a hydraulic pump, including pump portion 42 of generally conventional construction, for providing accessory hydraulic power or hydraulic power to the aircraft hydraulic system. Electrical generator 40 can be used to provide electrical power to any variety of accessories or components of the aircraft.

More particularly, the first accessory power unit or pump 38 includes a first rotatable shaft means, generally designated 44, for pump 38. Actually, pump shaft means 44 includes a short pump shaft 44a splined to a longer shaft extension 44b on the inside of a housing 46. The pump is pad mounted to housing 46 for ready removal therefrom, and the splined interface between pump shaft 44a and shaft extension 44b facilitates removal of the pump for replacement or maintenance purposes. A bevel gear member 48 is fixed to shaft extension 44b of pump shaft means 44 and is in mesh, at 50, with bevel gear member 36 at the upper end of main drive shaft 28. Therefore, following the sequence described above, rotation of propellers 18 in the airstream effectively rotate pump shaft means 44. The pump itself, designated 42, is coupled to the opposite end of pump shaft means 44, as shown.

Second accessory power unit or electrical generator 40 also includes a second rotatable shaft means or generator shaft 52 interiorly of a generator housing 53. It can be seen that generator shaft 52 is generally parallel to pump shaft means 44. Generator housing 53 also is pad mounted to the gearbox housing, generally designated 53a as at 55, for ready removal of the generator.

Gear train means, generally designated 54, are rotatably mounted within a gearbox housing 56 extending between pump housing 46 and generator housing 53. As shown, the gearbox housing is substantially integral with and connect the other two accessory power unit housings. Gear train 54 effectively couples ram air turbine 10 to the second accessory power unit 40, through the first accessory power unit 38.

More particularly, a spur gear 58 is fixed for rotation with pump shaft means 44. A spur gear 60 is fixed to generator shaft 52 for rotation therewith. A third spur gear 62 is in mesh with spur gear 58, as at 64, and is in mesh with spur gear 60, as at 66. Spur gears 58,62 and 60 define gear train 54 within gearbox 56 rotatably coupling rotatable shaft means 44 and 52 of first accessory power unit 38 and second accessory power unit 40, respectively. Therefore, the drive chain from ram air turbine 10 to the last accessory power unit is completed through the various gear means and power train described.

Summarizing the operation of the drive system of this invention, propellers 18 are effective, when moving in the air stream, to rotate turbine shaft 20. The turbine shaft, through bevel gear means 30,34 rotate main drive shaft 28. The main drive shaft, through bevel gear means 36,48 rotate first accessory power unit shaft 40. The first accessory power unit shaft, through gear train means 54 (i.e. spur gears 58,60 and 62) rotate second accessory power unit shaft 52. It can be seen that the entire drive system is contained within appropriate housings all the way from the ram air turbine to the last accessory power unit. All of the accessory power units are disposed within the aircraft fuselage and thereby eliminate any exterior soft or flexible piping or rotary joints. The reliability of hard piping therefore can be taken advantage of in use totally within the protection of the aircraft fuselage.

Still further, the weight of the drive system can be reduced and utility increased, by using bevel gearsets 30, 34 and 36, 48 along with the gearbox 54, to provide differential rotational speeds to pump 38 and generator 40 regardless of the input speed of turbine 10. This not only allows the selection of optimum turbine and accessory rotational speeds but also minimizes total system weight and allows for more torque to be made available per allowed weight.

As a comparative example, with an in-line pump and generator arrangement, no gearbox is employed whether this massive asemblage is disposed in the airstream or not. The accessories simply are added along an axial shaft which necessarily rotates all the associated devices at the same speed. However, with the system of this invention, a higher speed generator can be employed by using a speed differential in gear train 54 between the accessory power units. As is known, the higher the synchronous speed of a generator, the lighter will be its overall weight.

For example, a 6,000 RPM ram air turbine 10 might be employed. With an in-line system, a 6,000 RPM generator also would have to be employed. Such a conventional generator weighs on the order of 20 pounds. With the system of the invention, a 12,000 RPM generator might be employed and such a generator weighs on the order of 15 pounds. The gearbox, including gear train means 54, weighs on the order of 4 pounds. Therefore, the weight of the 12,000 RPM generator plus the gearbox still does not weigh as much as a standard 6,000 RPM generator. Thus, it can be seen that not only can a differential speed system be employed with the invention, but such a system actually will be of lighter weight than known in-line systems.

From the foregoing it can be seen that the invention has quite a number of advantages. Maintainability is enhanced due to easy removal of the generator and pump accessories. A small airstream envelope is provided with the accessories apart from the turbine. As stated, the turbine, generator and pump can be run at their optimum speeds. The dynamic deployment weight is reduced by separating the accessories from the turbine. Therefore, deployment impact loads are reduced.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A drive system between a ram air turbine and at least a pair of accessory power units of an aircraft, the ram air turbine being movable between stowed and deployed positions relative to the fuselage of the aircraft, the drive system comprising:
   a first drive shaft extending between the ram air turbine and a second drive shaft of a first accessory power unit within the aircraft fuselage;
   first bevel gear means drivingly connecting an outer end of the first drive shaft to a rotating member of the ram air turbine;
   second bevel gear means drivingly connecting an inner end of the first drive shaft to the second drive shaft of the first accessory power unit; and
   gear train means drivingly connecting the second drive shaft of the first accessory power unit to a rotatable drive member of a second accessory power unit within the aircraft fuselage.

2. The drive system of claim 1 wherein said second bevel gear means are located at one end of the second drive shaft of the first accessory power unit.

3. The drive system of claim 2 wherein said first accessory power unit is located at an opposite end of the second drive shaft, and said gear train means are located intermediate the ends of the second drive shaft.

4. The drive system of claim 3 wherein said rotatable drive member of the second accessory power unit comprises a third drive shaft extending generally parallel to the second drive shaft of the first accessory power unit.

5. The drive system of claim 4 wherein said gear train means include a gearbox extending between respective housings of the first and second accessory power units.

6. The drive system of claim 4 wherein said gear train means include spur gears extending radially between the generally parallel second and third drive shafts.

7. The drive system of claim 1 wherein said gear train means include spur gears extending transversely between the second and third drive shafts.

8. The drive system of claim 1 wherein said gear train means include a gearbox extending between respective housings of the first and second accessory power units.

9. The drive system of claim 1 wherein said first accessory power unit comprises a pump.

10. The drive system of claim 9 wherein said second accessory power unit comprises a generator.

11. A drive system between a ram air turbine and at least a pair of accessory power units of an aircraft, the ram air turbine being movable between stowed and deployed positions relative to the fuselage of the aircraft, the drive system comprising in combination:
    a ram air turbine including a turbine shaft;
    a first accessory power unit within the aircraft fuselage and including first rotatable shaft means;
    a second accessory power unit within the aircraft fuselage and including second rotatable shaft means;
    drive shaft means extending between the ram air turbine and the first accessory power unit;
    first bevel gear means rotatably coupling an outer end of the drive shaft means with the turbine shaft;
    second bevel gear means rotatably coupling an inner end of the drive shaft means with the first rotatable shaft means; and
    gear train means rotatably coupling the first rotatable shaft means and the second rotatable shaft means.

12. The drive system of claim 11 wherein said second bevel gear means are located at one end of the first rotatable shaft means of the first accessory power unit.

13. The drive system of claim 12 wherein said first accessory power unit is located at an opposite end of the first rotatable shaft means, and said gear train means are located intermediate the ends of the first rotatable shaft means.

14. The drive system of claim 13 wherein said first and second rotatable shaft means of the first and second accessory power units, respectively, are generally parallel.

15. The drive system of claim 14 wherein said gear train means include a gearbox extending between respective housings of the first and second accessory power units.

16. The drive system of claim 14 wherein said gear train means include spur gears extending radially between the generally parallel first and second rotatable shaft means.

17. The drive system of claim 11 wherein said gear train means include spur gears extending transversely between the first and second rotatable shaft means.

18. The drive system of claim 11 wherein said gear train means include a gearbox extending between respective housings of the first and second accessory power units.

19. The drive system of claim 11 wherein said first accessory power unit comprises a pump.

20. The drive system of claim 19 wherein said second accessory power unit comprises a generator.

21. A drive system between a ram air turbine and at least a pair of accessory power units of an aircraft, the ram air turbine being movable between stowed and deployed positions relative to the fuselage of the aircraft, the drive system comprising:

drive shaft means extending between the ram air turbine and a first accessory power unit within the aircraft fuselage;
 first gear means rotatably coupling an outer end of the drive shaft means to the ram air turbine;
 second gear means rotatably coupling an inner end of the drive shaft means to the first accessory power unit; and
 third gear means rotatably coupling the first accessory power unit to a second accessory power unit within the aircraft fuselage.

22. The drive system of claim 21 wherein said first and second accessory power units include generally parallel drive shafts, and said third gear means extend radially between and rotatably couples the drive shafts.

* * * * *